United States Patent
Swiencicki et al.

(10) Patent No.: US 7,456,358 B2
(45) Date of Patent: Nov. 25, 2008

(54) OPENING ADAPTER

(75) Inventors: Stanley R. Swiencicki, Whitestone, NY (US); Paul Kadar, Seaford, NY (US); Denise Chan-Richter, Bethpage, NY (US); Leslie Lindenstraus, New York, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/127,088

(22) Filed: May 12, 2005

(65) Prior Publication Data

US 2006/0005989 A1 Jan. 12, 2006

Related U.S. Application Data

(60) Provisional application No. 60/574,332, filed on May 25, 2004.

(51) Int. Cl.
*H02G 3/14* (2006.01)

(52) U.S. Cl. .................... 174/66; 174/67; 220/241; 220/242

(58) Field of Classification Search .......... 177/66, 177/67, 53, 58, 57, 17 CT; 220/241, 242, 220/3.7, 3.8; D13/156, 177, 152; D8/353; 439/536, 535; 200/239
See application file for complete search history.

(56) References Cited

U.S. PATENT DOCUMENTS

| | | | |
|---|---|---|---|
| 3,908,235 A | 9/1975 | Telliard et al. | |
| 4,835,343 A * | 5/1989 | Graef et al. | 174/66 |
| 5,073,681 A | 12/1991 | Hubben et al. | |
| D328,453 S | 8/1992 | Naumann | |
| 5,180,886 A * | 1/1993 | Dierenbach et al. | 174/66 |
| 5,189,259 A * | 2/1993 | Carson et al. | 174/66 |
| 5,449,860 A | 9/1995 | Buckshaw et al. | |
| 5,723,817 A * | 3/1998 | Arenas et al. | 174/66 |
| 5,895,888 A * | 4/1999 | Arenas et al. | 174/66 |
| 6,184,466 B1 | 2/2001 | Eder et al. | |
| 6,218,617 B1 | 4/2001 | Estanislao et al. | |
| 6,329,596 B1 | 12/2001 | Justiniano et al. | |
| 6,609,927 B2 | 8/2003 | Kidman | |
| 6,679,725 B2 | 1/2004 | Kidman | |
| 6,840,800 B2 | 1/2005 | Kidman | |
| 6,979,790 B2 * | 12/2005 | Endres et al. | 200/339 |
| D517,010 S * | 3/2006 | Fort et al. | D13/139.3 |
| 7,030,318 B2 | 4/2006 | Tufano et al. | |

(Continued)

OTHER PUBLICATIONS

PCT International Search Report for PCT/US2007/073702 dated Feb. 19, 2008.

(Continued)

*Primary Examiner*—Angel R Estrada
(74) *Attorney, Agent, or Firm*—Carter, DeLuca, Farrell & Schmidt, LLP

(57) ABSTRACT

An adapter having a front face with a flange portion and a centrally located opening. The opening has an inner dimension sized to accept at least a front face of a wiring device and the flange has an outer dimension sized to fit at least within an opening of a front face of a wall plate. The flange portion has a vertical surface contour along a vertical direction of the flange and a horizontal surface contour along a horizontal direction of the flange such that, when the adapter is installed, the contours of the flange result in a smooth transition from the wiring device to the wall plate.

14 Claims, 3 Drawing Sheets

U.S. PATENT DOCUMENTS

| | | |
|---|---|---|
| 7,049,511 B2 | 5/2006 | Gledhill |
| 7,077,695 B2 | 7/2006 | Kidman |
| 7,083,467 B2 | 8/2006 | Kidman |
| D529,787 S | 10/2006 | Swiencicki et al. |
| 7,118,413 B2 | 10/2006 | Kidman |
| D532,288 S | 11/2006 | Chan-Richter et al. |
| 2003/0226678 A1 | 12/2003 | Oddsen et al. |
| 2003/0226682 A1 | 12/2003 | Tufano et al. |
| 2003/0226683 A1 | 12/2003 | Tufano et al. |
| 2003/0226684 A1 | 12/2003 | Schmieta et al. |
| 2005/0109527 A1 | 5/2005 | Tufano et al. |
| 2005/0122666 A1 | 6/2005 | Schmieta et al. |
| 2005/0130466 A1 | 6/2005 | Oddsen et al. |
| 2005/0257951 A1 | 11/2005 | Xu et al. |
| 2006/0005989 A1 | 1/2006 | Swiencicki et al. |
| 2006/0086525 A1 | 4/2006 | Xu et al. |
| 2006/0124337 A1 | 6/2006 | Schmieta et al. |
| 2006/0124338 A1 | 6/2006 | Tufano et al. |
| 2006/0137892 A1 | 6/2006 | Oddsen et al. |
| 2006/0157265 A1 | 7/2006 | Tufano et al. |

OTHER PUBLICATIONS

Cheetah Catalog, Jan. 2006.

\* cited by examiner

OPENING ADAPTER

This application claims the benefit of the filing date of a provisional application having Ser. No. 60/574,332, which was filed on May 25, 2004.

BACKGROUND OF THE INVENTION

1. Field of the Invention

The present invention generally relates to an adapter for an electrical wiring device.

2. Description of the Related Art

When modifying the wiring in an existing building, whether public, commercial or residential by adding a wiring device such as a switch, a receptacle or a combination of switches and receptacles, it is necessary to cut a hole in a wall of the building, install a box within the hole, attach the box to a vertical stud and install the wiring device or devices into the box. In new construction, the box is attached to a stud of an open wall and, thereafter, the wall, which may be sheet rock having an opening for access to the box, is placed over the studs. The conventional wall box has a pair of mounting ears for mounting the wiring devices to the box. After the wiring devices are connected to the various conductors which they will service, each is fastened with threaded fasteners, such as screws, to a pair of ears on the box. The process of connecting a wiring device to various conductors and then attaching the wiring device with the attached wires to the box is done for each wiring device located within the box.

Wiring devices in the same outlet box are aligned with each other, positioned parallel to each other and then spaced from each other by a distance dictated by the spacing between the openings or windows in a complementary wall plate. After the wiring devices are positioned relative to each other, the wall plate can be installed around the wiring devices. An existing electrical device or the wall plate may be changed to a newer or different device where the opening in the wall plate is larger than the wiring device. Thus what is needed is a device to close the gaps between the wiring device and the opening in the wall plate.

SUMMARY OF THE INVENTION

An adapter can facilitate the attachment of an electrical wiring device to a wall plate. The adapter is substantially a plate that includes a central opening having an inner dimension to accommodate a first style of electrical device. The adapter has an outer dimension sized to fit into a wall plate opening that is not complementary to the electrical device. The adapter can have a contour along a vertical surface and a contour along a horizontal surface to match the contour of the electrical device to a contour of the wall plate; that is, the contours of the adapter can be arranged to result in a smooth transition from the electrical device to the wall plate.

Some implementations of the disclosed adapter may have one or more of the following advantages. The adapter can adapt a wall plate that can accommodate one or more wiring devices having physical dimensions that are different for the different electrical devices. The adapter can allow the alignment of a wall plate to multiple wiring devices positioned side-by-side in a common outlet box.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest terms.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

DETAILED DESCRIPTION OF THE INVENTION

The present invention provides an adapter to cover a resulting gap between a wall and a wiring device mounted under the wall plate. The adapter has a front face with a flange portion and a centrally located opening. The opening has a dimension sized to accept at least a front face of a wiring device. The overall dimension of the flange portion is sized to fit at least within an opening of a wall plate. The adapter is configured and designed so as to be placed between the wiring device and the wall plate thereby covering any potential spacing or gaps between the two components.

Figure 1:
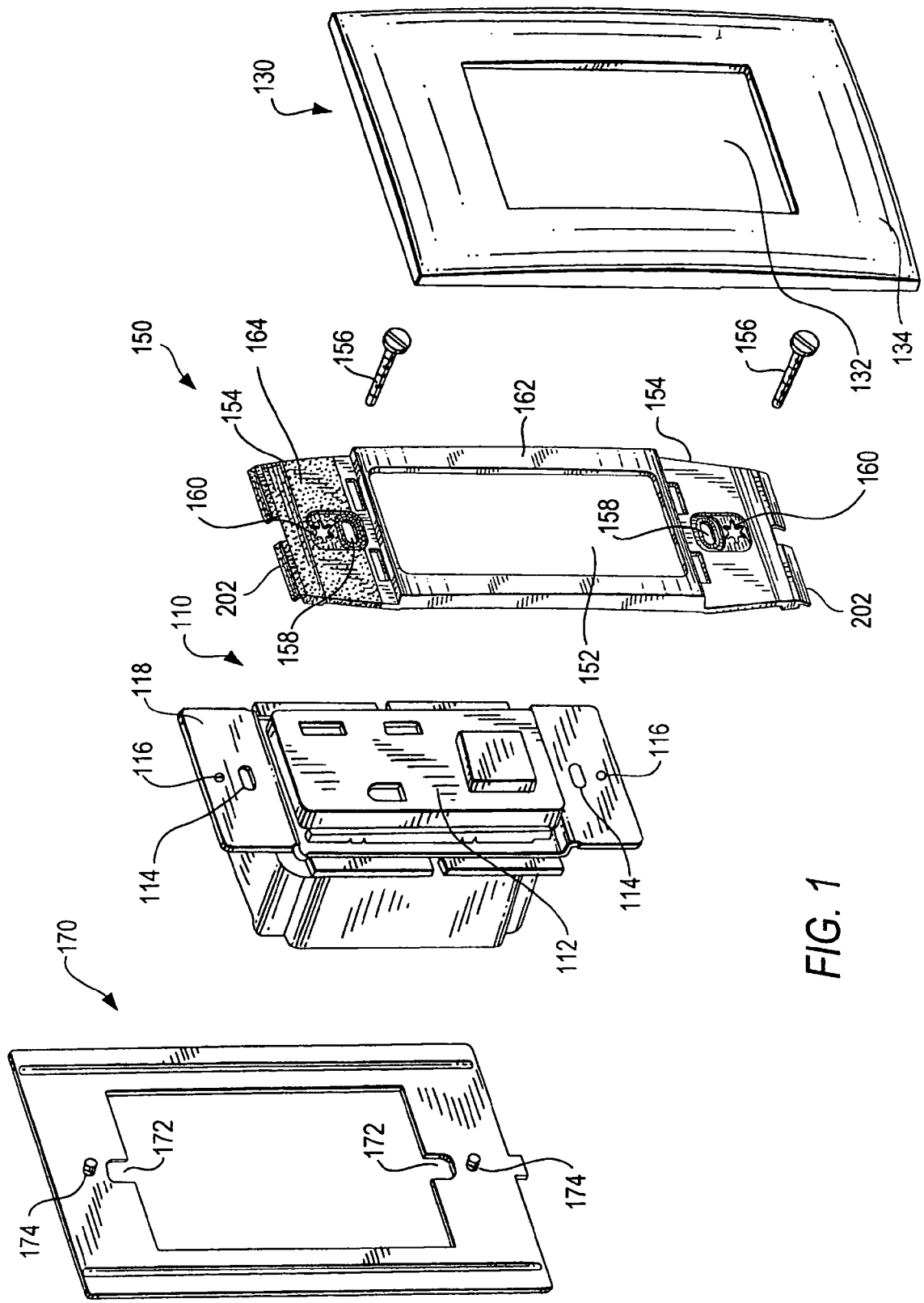
FIG. 1 is an exploded view of an assembled wiring device an embodiment of an adapter of the present invention.

FIG. 1 is an exploded view of an adapter 150 for attaching a wiring device such as a combination receptacle and switch 110 to a wall plate 130. The adapter 150 has a centrally located opening 152 having a dimension indicated by horizontal and vertical dimensions 161 and 163 respectively. The adapter has a flange portion 162 having an overall dimension indicated by horizontal and vertical dimensions 151 and 153, respectively. See FIG. 2A. The dimensions of the opening 152 are sized to accept at least a front face 112 of the wiring device 110 and the overall dimensions of the flange portion are sized to fit at least within an opening 132 of the wall plate 130. The flange portion 162 is adjacent to the opening 152 and extends outwardly therefrom. The adapter 150 can include mounting ears 154 that can secure the adapter 150 to an alignment plate 170 and a wall plate 130. The mounting ear 154 has an alignment pin retainer 160 for frictionally receiving and holding captive an alignment pin 174 of the alignment plate 170. The mounting ears 154 can also have a mounting hole 158 to receive a mounting screw 156 and a wall plate retainer 202 (see also FIG. 2A) to retain the wall plate 130 during installation of the adapter. One or more of the mounting ears 154 can have a metallized portion 164 that covers substantially all of the mounting ear, front, back and sides, as indicated by the stippling in the figures. The metallized portion 164 can extend into the mounting hole 158.

When the dimensions of the opening 132 of the wall plate 130 and the dimensions of the face 112 of the wiring device 110 are not compatible, there will be a gap around the periphery of the wiring device, which must be filled in. This gap will hereinafter be referred to as a contour gap. In an illustrative assembly, the wiring device 110 is coupled to the alignment plate 170 having alignment pins 174 that fit into and extend through alignment holes 116 on the wiring device ear 118. The adapter 150 is then positioned around the wiring device and moved back toward the wiring device until the pins 174 of alignment plate 170 pass into and are held captive by the alignment pin retainer 160 of adapter 150. Mounting screw 156 passes through opening 158 in mounting ear 154. The metallized portion 164 that extends into the opening 158 such that, when the screw 156 is inserted into the opening 158, the metal portion can contact the screw. The mounting screw 156 passes through clearance openings 114 in the wiring device ear 118, clearance openings 172 in alignment plate 170 and threads into openings in an outlet box (not shown). Tightening of the screw 156 draws the face 112 of the wiring device into the opening 152 of the adapter 150 that is sized to receive said face. Thus, the wiring device is held captive between the adapter 150 and against the alignment plate 170. Alignment pins 174 of alignment plate 170 hold the wiring device 110 and adapter plate 150 in a desired physical relationship. Thereafter, the wall plate 130 is placed around the adapter flange portion 162 and is held to the adapter by a wall plate retainer 202 (FIG. 2A) of the mounting ears 154, which engage projections (not shown) on the inside surface of the wall plate. Thus, the wall plate 130 is attached to the adapter 150 and the flange portion 162 of the adapter extends through the wall plate opening 132 to fill the contour gap between the wiring device front surface 112 and the wall plate opening 132. In some implementations the adapter also may have threaded holes (not shown) to receive screws for mounting the wall plate to the adapter. The wall plate covers remaining portions of the adapter and wiring device and screw 156, alignment plate 170 and the outlet box (not shown). Potential gaps between the wiring device front face 112 and wall plate opening 132 are thus reduced by placing the adapter 150 between the wiring device 110 and the wall plate 130.

Figure 2:
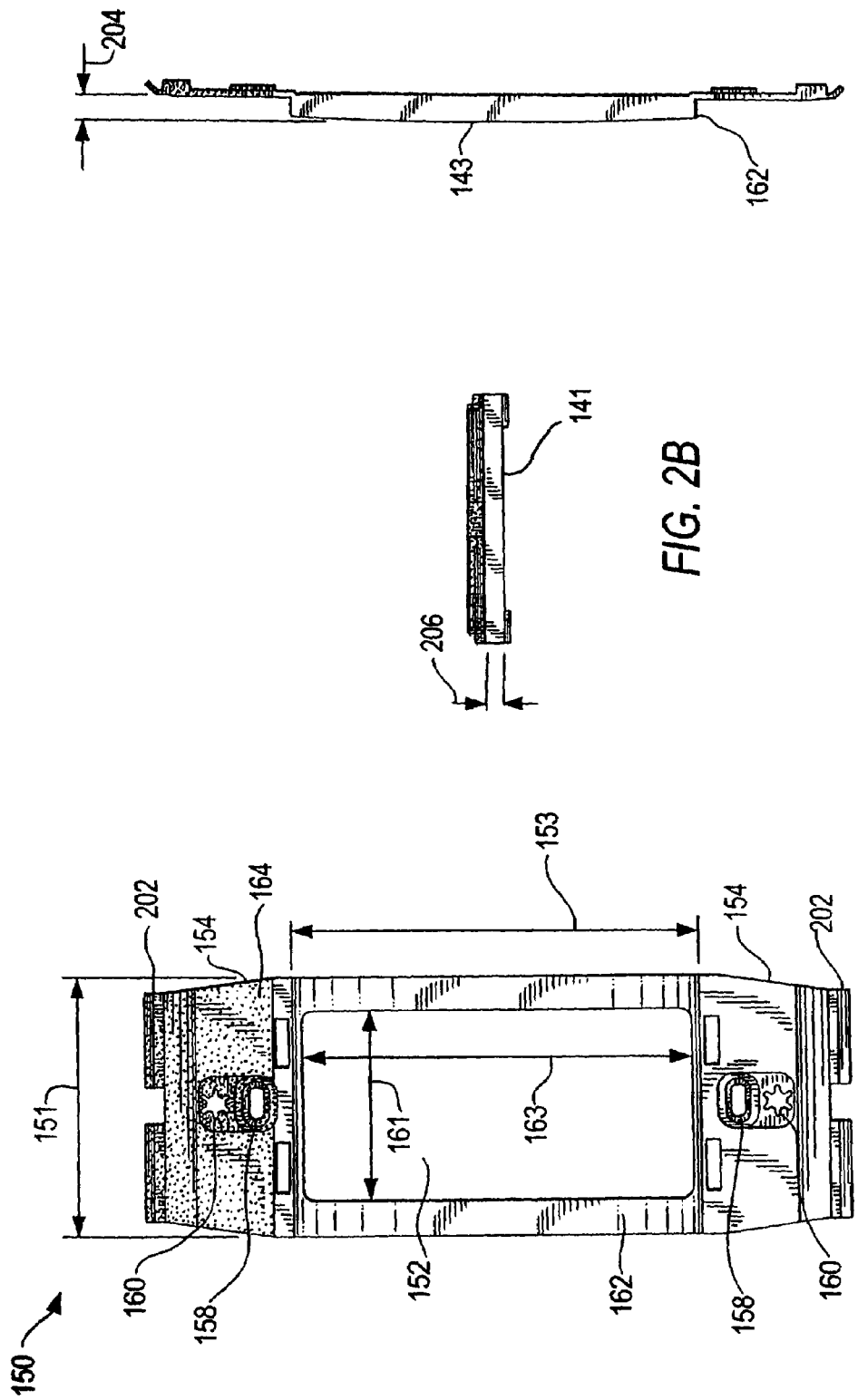
FIG. 2A is a front view of the adapter of FIG. 1.
FIG. 2B is a top end view of the adapter of FIG. 2A.
FIG. 2C shows a side view of the adapter of FIG. 2A.

FIGS. 2A, 2B and 2C show the front, top end and side views of the adapter 150 of FIG. 1. In one embodiment, the centrally located opening 152 is rectangular-shaped with the dimension 161 along the horizontal direction and the dimension 163 along the vertical direction. The adapter also has a flange with outer dimension 151 along the horizontal direction and outer dimension 153 along the vertical direction. The overall dimensions of the adapter are such that the adapter is covered over by a wall plate. The adapter 150 has a front face with a particular horizontal surface contour 141 running from the top to the bottom portions of the plate along the horizontal direction and a vertical surface contour 143 that can be observed from a side view (FIG. 2C) of the adapter on the sides of the plate along the vertical direction. The shape of the surface contours can be such that they match or complement the surface contour shapes of the face 112 of the wiring device 110 and the face 134 of the wall plate 130 as shown in FIG. 1.

In the embodiment shown, the opening 152 of the adapter 150 is substantially rectangular and the contour of the flange portion 162 along the horizontal surface 141 of the face of the adapter is substantially flat in one plane and the contour along the vertical surface 143 is convex. The dimensions 161, 163 of the adapter opening 152 and the outer dimensions of the front face 112 of the wiring device 110 are such that, when the wiring device is inserted into opening 152, the adapter can present a smooth, continuous transition across the front surfaces of the wiring device 110 and the adapter 150. In a similar manner, the outer dimensions 151, 153 of the flange portion 162 of the adapter and the inside dimensions of the opening 132 of the wall plate 130 are such that, when the adapter is inserted into the opening of the wall plate, the adapter can provide a continuous transition between the front surfaces of the wall plate and the adapter.

Referring to FIG. 2C, the flange portion 162 of the adapter has a thickness 204 along the vertical surface 143 sufficient to extend at least to the front face of a wall plate to complement the wall plate and/or wiring device. The vertical surface 143 may be convex, concave, flat, or a combination thereof, extending from the top to the bottom of the vertical surface along the outer dimension 153 of the adapter. Referring to FIG. 2B, the flange portion 162 has a thickness 206 along the horizontal surface 141 sufficient to extend at least to the front face of a wall plate to complement the wall plate and/or wiring device. The shape of the horizontal surface 141 may be convex, concave, flat, or a combination thereof, extending across the horizontal surface along the outer dimension 151 of the adapter 150.

In an embodiment where the wiring device is a switch, the front surface of the flange portion may be shaped to follow the same contours, surfaces and shape as the wall plate. In those instances where the wiring device is a receptacle, the contour of the flange portion along the horizontal direction can be flat and the contour along the vertical direction of the flange portion can have a constant radius to match or complement the contour of the receptacle and/or wall plate. In a particular example, the radius is substantially thirty inches.

Other embodiments relate to the surface shapes of the front face of the flange portion. For example, the front face of the adapter may have a flat surface along the horizontal and vertical directions, a convex surface along the horizontal and vertical direction, or a convex surface along the horizontal direction and a flat surface along the vertical direction.

The adapter can be made from conductive material, non-conductive material or a combination thereof. In an implementation, the mounting ears 154 (FIG. 1) can be made of a plastic material that has a metallized surface. When the adapter is installed, the metallized surface can provide for electrical continuity between the adapter and the wiring device ear 118 (FIG. 1), which may, in turn, be connected to a ground of the AC power source. The present invention contemplates a system wherein multiple electrical wiring devices in numbers not expressly set forth hereinabove may be utilized.

Figure 3:
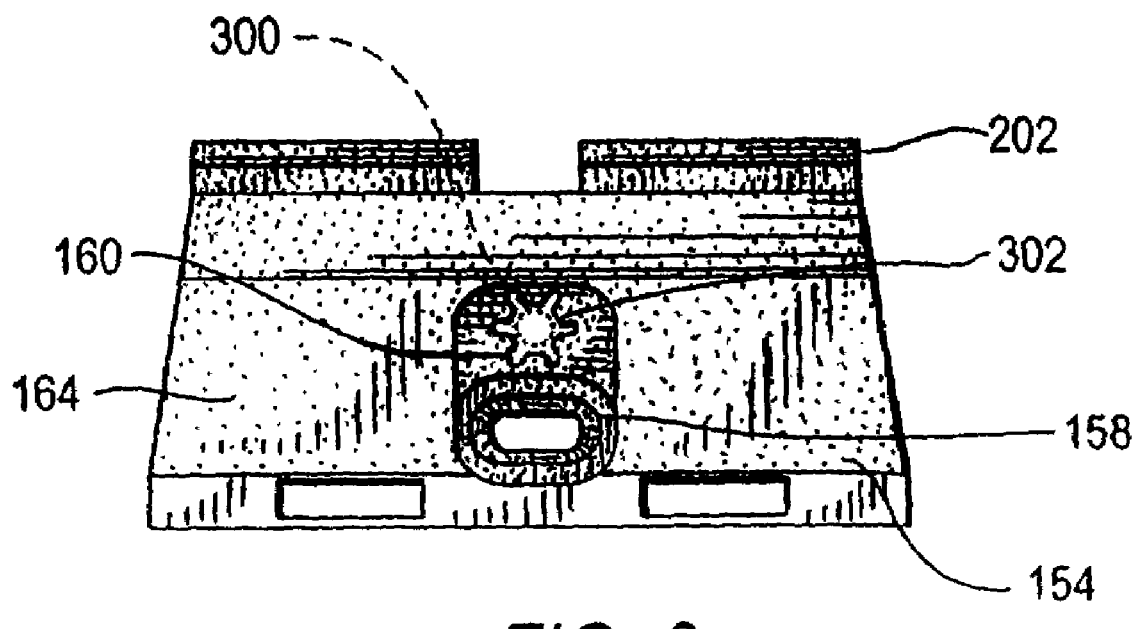
FIG. 3 is an enlarged view of a mounting ear of the adapter.

FIG. 3 is an implementation of the mounting ear 154. The alignment pin retainer 160 has flexible fingers 302 defining an opening 300 for receiving an alignment pin. The front surface 164 can be metallized. The metallized portion 164, indicated by stippling in FIG. 3, can be composed of aluminum, copper or the like. The metallized portion 164 can extend slightly into the opening 158 such that, when the mounting screw 156 (FIG. 1) is inserted in the opening 158, threaded body of the mounting screw 156 is in electrical contact with, and loosely held captive by, the metallized portion 164. Engagement of the metallized portion 164 with the mounting screw 156 can provide an electrical connection between a metallic ground strap of the wiring device, the screw and the metal outlet box to ensure that the wiring device is connected to ground. Tightening of the mounting screw 156 also can bring the metallized portion 164 of the back surface (not shown) of mounting ear 154 into electrical contact with the wiring device ear 118 (FIG. 1). In installations having an electrically conductive wall plate 130 (see FIG. 1), engagement of the wall plate 130 with the metallized portion 164 can provide a ground connection to the wall plate as well. Opening 158 is sized to allow the mounting screw 156 to be moved laterally to compensate for slight misalignments that may occur.

While there have been shown and described and pointed out the fundamental novel features of the invention as applied to the preferred embodiments, it will be understood that various omissions and substitutions and changes of the form and details of the apparatus illustrated and in the operation may be done by those skilled in the art, without departing from the spirit of the invention.

What is claimed is:

1. An adapter having a flange portion substantially formed on a front face, an inner perimeter of said front face defining an inner edge of said adapter and an outer perimeter of said front face defining an outer edge of said adapter, said adapter further having a centrally located opening defined by said inner edge wherein the opening has dimensions that are sized to accept at least a front face of a first wiring device and the flange portion has an overall dimension defined by the inner and outer edges that is sized to fit at least within and extend through an opening of a wall plate, the flange portion having an outer lateral dimension defined by the outer edge and being not greater than an inner lateral dimension of the opening of the wall plate, said opening of said wall plate being sized to accept a front face of a second wiring device and wherein said front face of said second wiring device is larger than said front face of said first wiring device.

2. The adapter of claim 1, wherein the flange portion has a vertical surface contour along a vertical direction of the flange and a horizontal surface contour along a horizontal direction of the flange, and wherein, when the adapter is installed, the vertical and horizontal contours of the flange portion are arranged to result in a smooth transition from the wiring device to the wall plate.

3. The adapter of claim 2 having a mounting ear comprising: an alignment pin retainer to receive an alignment pin wherein said alignment pin, when received, is frictionally captivated by the alignment pin retainer; and a wall plate retainer to receive and fasten a wall plate to the adapter.

4. The adapter of claim 3, wherein the mounting ear has a metallized portion.

5. The adapter of claim 4, wherein the mounting ear has a screw opening for a mounting screw and wherein the metallized portion extends into the screw opening such that when the mounting screw is inserted through the screw opening, the metallized portion resists removal of the mounting screw and makes electrical contact with the mounting screw.

6. The adapter of claim 2, wherein the flange portion has a flat contour along a horizontal direction of the front surface and has a convex contour along a vertical direction of the front face surface.

7. The adapter of claim 6, wherein the convex surface along the vertical direction of the front surface of the flange portion has a constant radius.

8. The adapter of claim 7, wherein the constant radius is substantially thirty inches.

9. An adapter comprising:
a flange portion formed on a front face and having a centrally located opening wherein the opening has dimensions that are sized to accept at least a front face of a first wiring device and the flange portion has an overall dimension that is sized to fit at least within and extend through an opening of a wall plate, the flange portion having an outer lateral dimension not greater than an inner lateral dimension of the opening of the wall plate, said opening of said wall plate being sized to accept a front face of a second wiring device and wherein said front face of said second wiring device is larger than said front face of said first wiring device, wherein the flange portion has a vertical surface contour along a vertical direction of the flange and a horizontal surface contour along a horizontal direction of the flange, wherein, when the adapter is installed, the vertical and horizontal contours of the flange portion are arranged to result in a smooth transition from the wiring device to the wall plate;
a mounting ear comprising: an alignment pin retainer to receive an alignment pin wherein said alignment pin, when received, is frictionally captivated by the alignment pin retainer; and
a wall plate retainer to receive and fasten a wall plate to the adapter.

10. The adapter of claim 9, wherein the mounting ear has a metallized portion.

11. The adapter of claim 10, wherein the mounting ear has a screw opening for a mounting screw and wherein the metallized portion extends into the screw opening such that when the mounting screw is inserted through the screw opening, the metallized portion resists removal of the mounting screw and makes electrical contact with the mounting screw.

12. The adapter of claim 9, wherein the flange portion has a flat contour along a horizontal direction of the front surface and has a convex contour along a vertical direction of the front face surface.

13. The adapter of claim 12, wherein the convex surface along the vertical direction of the front surface of the flange portion has a constant radius.

14. The adapter of claim 13, wherein the constant radius is substantially thirty inches.

* * * * *